R. W. AMOS.
APPARATUS FOR DISPOSITION OF GARBAGE, SLUDGE, AND OTHER LIKE SUBSTANCES.
APPLICATION FILED FEB. 15, 1912.
1,188,382.  
Patented June 27, 1916.  
4 SHEETS—SHEET 2.
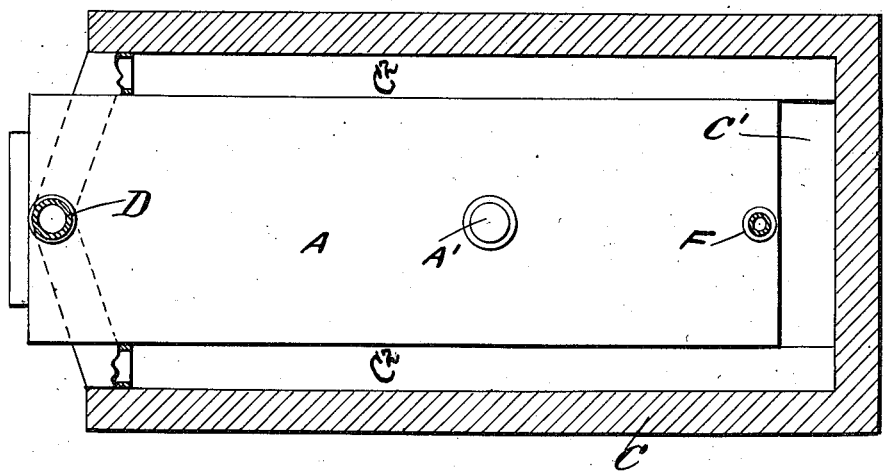
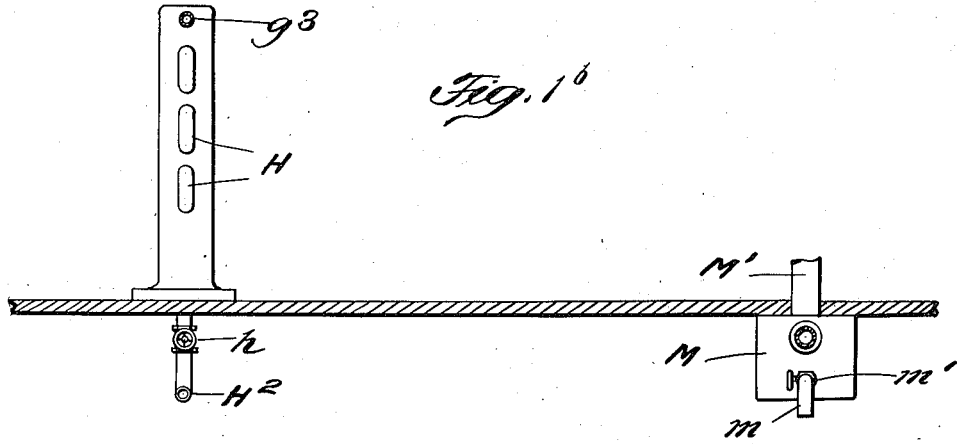

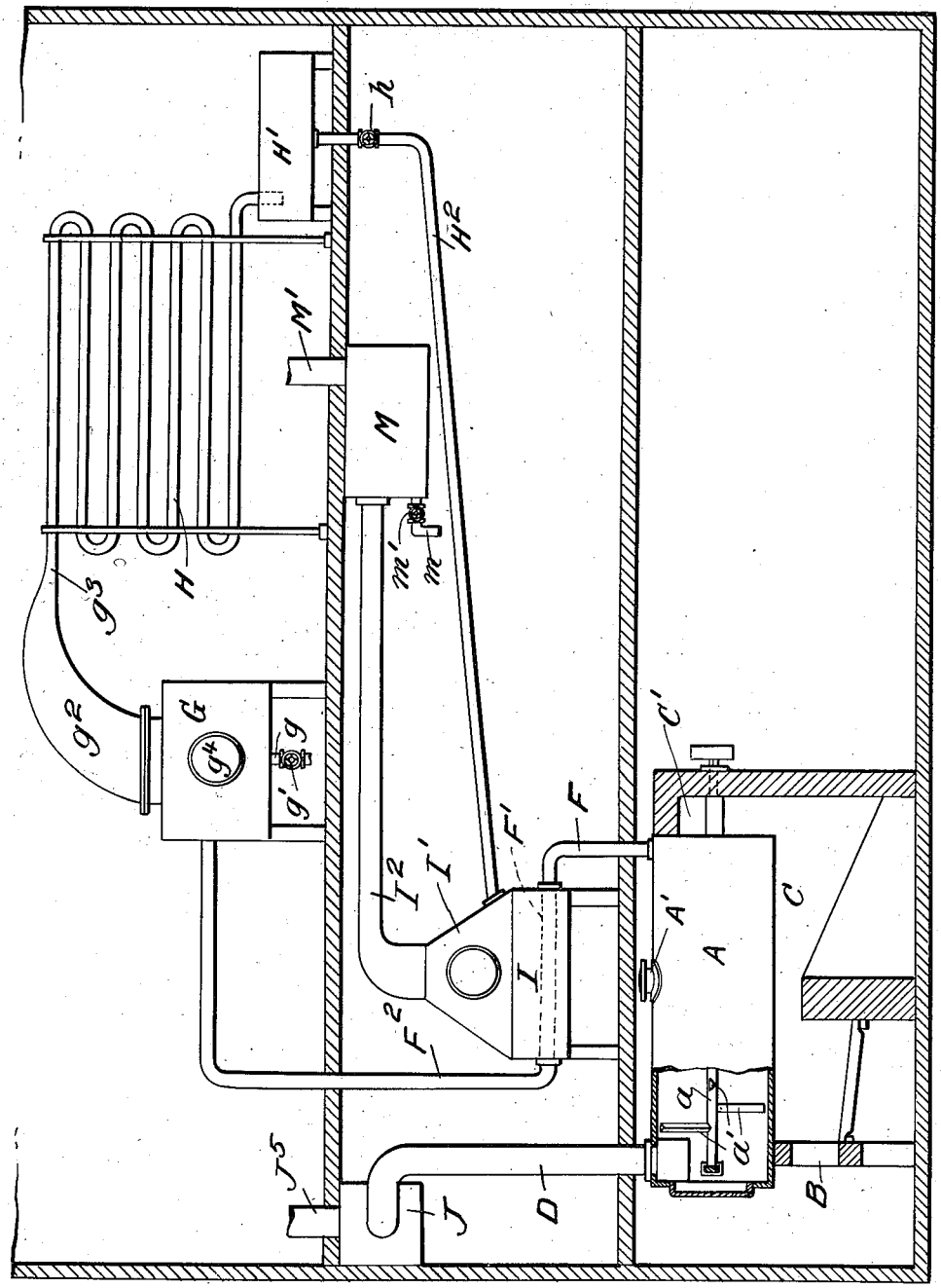

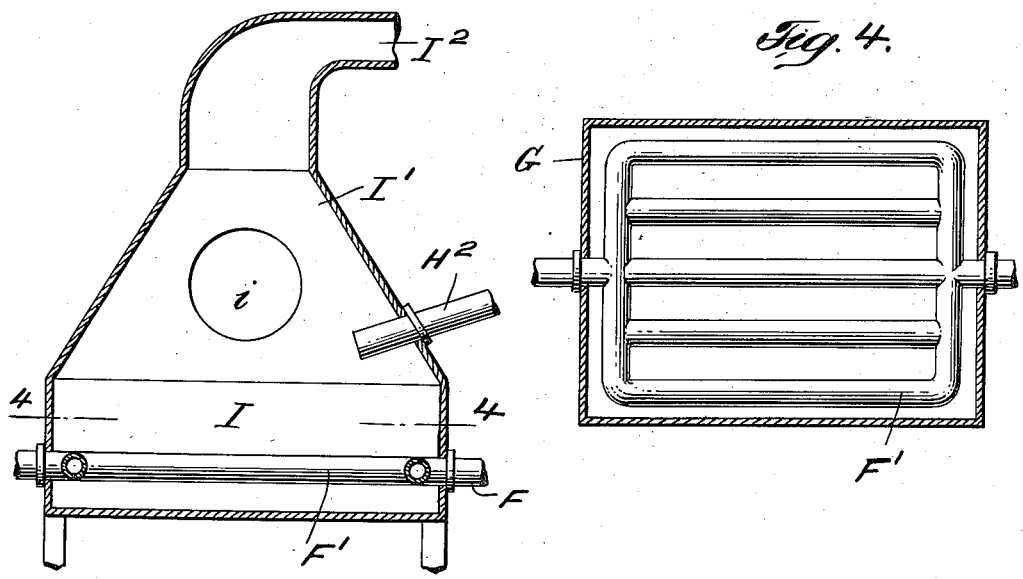
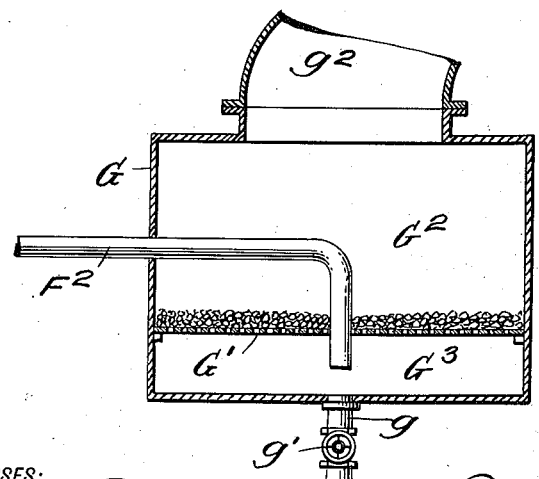

R. W. AMOS.
APPARATUS FOR DISPOSITION OF GARBAGE, SLUDGE, AND OTHER LIKE SUBSTANCES.
APPLICATION FILED FEB. 15, 1912.
1,188,382.
Patented June 27, 1916.
4 SHEETS—SHEET 4.
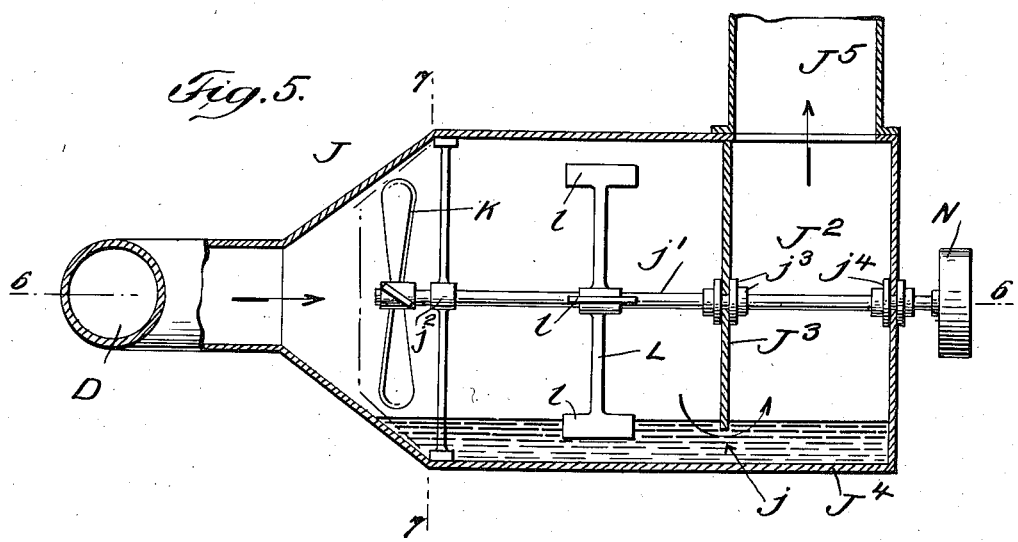
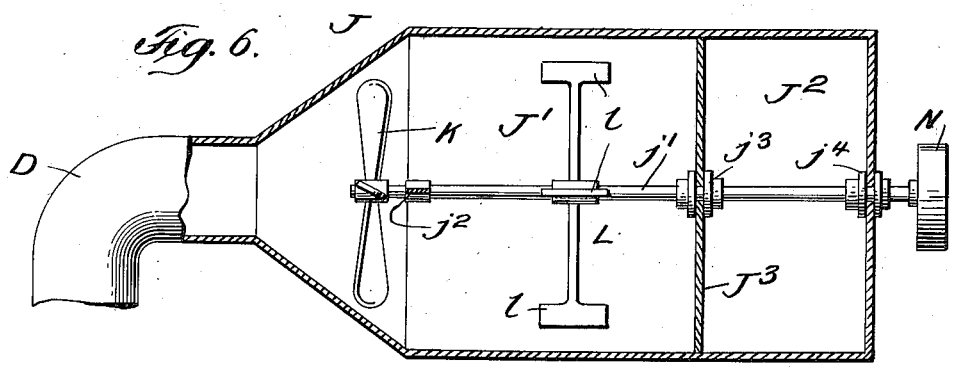
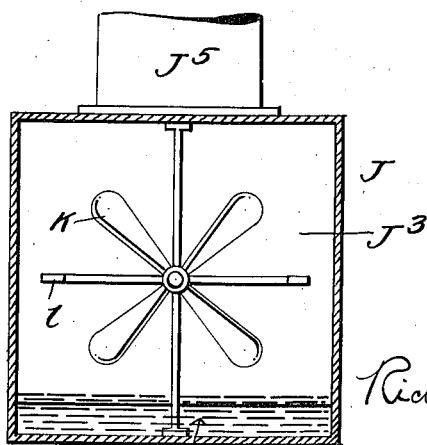

UNITED STATES PATENT OFFICE.

RICHARD W. AMOS, OF HACKENSACK, NEW JERSEY, ASSIGNOR TO NATIONAL PURIFICATION COMPANY, A CORPORATION OF NEW YORK.

APPARATUS FOR DISPOSITION OF GARBAGE, SLUDGE, AND OTHER LIKE SUBSTANCES.

1,188,382.

Specification of Letters Patent.   Patented June 27, 1916.

Application filed February 15, 1912. Serial No. 677,829.

*To all whom it may concern:*

Be it known that I, RICHARD W. AMOS, a citizen of the United States, and a resident of Hackensack, in the county of Bergen and State of New Jersey, have invented certain new and useful Improvements in Apparatus for Disposition of Garbage, Sludge, and other like Substances, of which the following is a specification.

This invention relates to improvements in apparatus for the disposition of garbage, sludge and other like substances.

By the use of my improved apparatus, I am enabled first to rapidly and effectively heat and agitate a suitable charge of material, consisting of garbage, night soil, sludge or other like substance, to drive off the volatile vapor contents, then in one compartment to condense the alcohol in such vapors by filtering the lighter vapors of ammonia; then to condense the ammonia liquors and simultaneously to fix or crystallize such ammonium liquors and evaporate the unnecessary water, utilizing the heat of the hot vapor-conducting pipe for this purpose which is branched to form a radiator within the crystallizing and evaporating compartment; then after all the volatile substances are driven off, the charge may be burned and the products of combustion compelled to filter through water to eliminate smell and the deposited carbon and other ingredients may be utilized in the commercial production of coloring matter at a comparatively low expense.

In the preferred embodiment of my invention, I provide a suitable tank or retort into which a suitable charge of material, consisting of garbage, night soil, sludge or other like substance may be introduced; means for agitating the charge comprising a series of arms, each triangular in cross-section, mounted on a shaft extending longitudinally through the tank; means for heating the charge to drive off the vapors of alcohol, ammonia and phosphoric acid, comprising a furnace of the usual type and flues bathing the major portion of the entire surface of the tank; a hot vapor-conducting pipe connected to the tank; a separating reservoir or box connected to the hot-vapor-conducting pipe and provided with a perforated plate located between the upper and lower edges thereof so as to divide the box into what I shall term filtering and condensing chambers, located respectively above and below such plate, a suitable agent, such as lime, superimposed on such plate in the filter chamber to fix or absorb the phosphoric acid and wash the ammonia vapors; means connected with the chamber below the perforated plate for drawing off the easily condensed alcoholic liquors; means above the said plate for conducting the ammonia vapors to a condensing coil; a condensing coil therefor and a compartment heated by the heat of the hot vapor conducting pipe to fix the resultant ammonia liquors. Furthermore my preferred form of apparatus embodies what I shall term a smoke consuming device for filtering the products of combustion through water to eliminate any smell remaining and to procure the carbon and other soluble contents, and comprises a compartment having communicating inlet and outlet chambers communicating respectively with the chimney and the outer atmosphere, the communicating channel between such chambers being through an opening in a dividing partition which extends to a point contiguous to the floor of the compartment, water or other suitable liquid filtering agent bathing the floor and a portion of the walls of both chambers so as to obstruct the communicating channel; a horizontal shaft extending within the inlet chamber, a fan mounted thereon for sucking the smoke into the inlet chamber and a splashing wheel also mounted on said shaft and extending into the water for driving the smoke into such water or other liquid.

In the accompanying drawings, in which similar reference characters designate corresponding parts throughout the several views, Figure 1 is a side elevation of apparatus embodying my invention; Fig. 1ª is a longitudinal section through the upper portion of the furnace illustrated in Fig. 1; Fig. 1ᵇ is a side elevation partly in section of the condensing coil and catch basin illustrated in Fig. 1; Fig. 2 is an enlarged sectional view of my separating box; Fig. 3 is an enlarged longitudinal section of my combined evaporating and crystallizing compartment; Fig. 4 is a cross section on the line 4—4 of Fig. 3; Fig. 5 is a longitudinal vertical section of my smoke consuming device; Fig. 6 is a horizontal section on the line 6—6 of Fig. 5; and Fig. 7 is a vertical section on the line 7—7 of Fig. 5.

Referring now to these drawings A designates a tank suitably supported over a furnace B. As illustrated, the tank is suitably supported to provide a rearwardly extending horizontal flue C, which with the furnace proper bathes the entire lower surface of the tank, a vertical flue C' bathing the rear end of the tank, and two forwardly extending flues (C² C²) which bathe the major portion of the upper surface of the tank, the last-mentioned flues communicating at their forward end with a chimney D which is provided at its outlet end with what I have termed a "smoke consuming device" hereinafter more particularly described.

The tank A is provided with a longitudinally-extending and centrally located shaft $a$ to which is fixed a series of agitating arms $a'$ each being triangular in cross-section and preferably mounted upon the shaft $a$ to present the apex of the triangular arms to the material during revolution.

The apparatus thus far described is in all respects similar to that described in Letters Patent No. 965,058, issued to me July 19th, 1910.

A suitable charge of garbage, sludge or night soil is introduced into the tank A, through the charging opening A' which charge is preferably treated with lime and nitrate salts comprising the refuse of gunpowder works and composed chiefly of sodium chlorid, sodium nitrate, potassium nitrate and potassium sulfate, these two ingredients being mixed together in the proportion of approximately seven to one and being mixed with the charge in the proportion of approximately twenty-five pounds of such ingredients to a ton of charge. By heating to a temperature of approximately 225° F. and agitating a charge the base of which, for example, is garbage or sludge, the vapors arising therefrom will contain alcohol, phosphoric acid and ammonia liquors and I provide novel apparatus for separating out the alcohol, absorbing the phosphoric acid with a suitable combining agent such as lime by compelling the same to filter through a suitable bed thereof, condensing the residual ammonia liquors and then simultaneously evaporating and crystallizing the same, and utilizing the heat of the vapor-conducting pipe for this purpose, which apparatus I will now describe.

Communicating with the rear end of the tank is a pipe F leading to what I shall term a "separating box" G. The box G is provided intermediate its upper and lower edges with a perforated plate G' dividing the box into what I shall term a condensing chamber G² and a filter chamber G³. The pipe F conducts the volatile vapors arising from the charge into this box beneath the plate G', where the alcoholic liquors are condensed. A discharge pipe $g$ having valve $g'$ communicates with the condensing chamber G² below the plate G to permit the readily condensed alcohol vapors to be drawn off, and suitable means of access to the chamber G³, such as the door $g^4$, is provided to permit a bed of lime to be superimposed upon the plate G' and for the removal and renewal of the same. A funnel $g^2$ and pipe $g^3$ connect the filter chamber G³ with a condensing coil H which discharges into a reservoir H'. The phosphoric-acid contents of the volatile vapors are thus absorbed or combined with the lime on the perforated plate to form phosphate of lime and the ammonia gases filtered through the bed of lime and are conducted off to the condensing coil, condensed and stored for further treatment as hereinafter set forth.

The apparatus thus far described is preferably located a sufficient distance above the connection between the tank A and the vapor pipe F to permit the liquors resulting from the condensation in the coil H to flow by gravity into a combined evaporating and crystallizing compartment I, containing sulfuric acid or other suitable agent which combines with ammonia to form a soluble salt of crystalline compound, when it may be readily handled. The compartment I is preferably located adjacent to the connection between the pipe F and the tank A so as to utilize the heat generated by the hot vapors passing said pipe. Preferably, the pipe F is branched intermediate its connection with the tank A and separating box G to form a radiator F', within the walls of the compartment I so as more effectively to heat the interior of the compartment I and thus to evaporate unnecessary water and assist in the rapid crystallization of ammonium sulfate or other compound which may be used for fertilizer or other suitable purpose. The vapors arising from the combined crystallizing and evaporating compartment I pass off through funnel I', pipe I² and into a catch basin M which, as shown, is provided with suitable means, such as the pipe $m$ having valve $m'$ for discharging its liquid contents and also with a chimney flue M' for permitting the escape of any portion of the vapors which may remain uncondensed. After driving off all matter that may be volatilized and driven off by heating and agitation, I preferably remove the charge in the tank and mix the same with a chemical mixture, the ingredients of which are hereinafter specified, in the proportion of approximately one pound of such mixture to twenty of material, to form a combustible material, and then burn the combustible material thus provided in the furnace to produce the heat necessary for further volatilization in the tank. To produce the best results, the proportion of the mixture employed should be varied according to the character of the material treated.

The ingredients of the mixture which I preferably employ are as follows:—From two ounces to one pound of oxalic acid. One pound nitrate salts (refuse from gunpowder mills composed chiefly of sodium chlorid, sodium nitrate, potassium nitrate and potassium sulfate). One pound lime. One pound sulfur. Two ounces charcoal. I am thus enabled to dispose of the entire ill-smelling substance, and when such material is burned I find that the ash thereof contains a large percentage of available potash, and also a large percentage of available phosphoric acid. When the aforesaid combustible material is burned I preferably treat the products of combustion to eliminate any smell that may be retained therein and to procure the carbon and other soluble contents, and for this purpose, I provide a "smoke consumer" at the top of the furnace chimney to filter through water such products of combustion.

My preferred form of smoke consumer, as shown, comprises a compartment J having an inlet chamber J' communicating with the chimney D and a chamber J² communicating with the atmosphere, the chamber J' and J² communicating with each other through a channel or opening j in a dividing partition J³ separating the two chambers J' and J². The communicating opening j, as shown, is contiguous to the floor J⁴ which is common to both chambers and is obstructed by a suitable liquid filtering agent. For this purpose, I preferably employ water with the addition of a small amount of lime. As shown, the liquid filtering agent bathes the floor J³, a portion of the walls of each chamber and extends above the edge of the communicating channel or opening j so as to obstruct the same and form a water seal between the two chambers J' and J² and the smoke or products of combustion from the furnace B is compelled to travel through this water seal before entering the outlet chamber and escaping into the atmosphere, the solid particles being precipitated, the soluble gases dissolved and the residue from which substantially all smell has been eliminated is permitted to escape.

In the preferred embodiment of my invention, I provide a horizontal shaft j' journaled in suitable bearings j² j³ and j⁴ supported by the walls and floor of the compartment in any suitable manner and extending within the inlet chamber. Mounted on the shaft j' contiguous to the inlet channel, I provide a suitable suction device, such as the fan K and also mounted on the shaft j' to the rear of the fan K, is a splashing wheel L having a series of splashing arms l dipping into the water or other liquid, the shaft being rotated by pulley N rotated from any suitable source of power, not shown. The rotation of the fan K will suck the products of combustion into the chamber J' and condense the same, and the splashing wheel L will drive such products through the water, the solid particles being precipitated, the soluble gases dissolved and the residue being washed and escaping into the outlet chamber. Any suitable means (not shown) for permitting the cleaning of the device and renewal of the water and lime is, of course, provided.

Having described my invention, I claim:—

1. In apparatus for treating garbage, the combination with a retort and means for heating a suitable charge of material therein; a pipe for conducting the hot vapors from such retort, means for condensing such vapors; and a combined evaporating and crystallizing compartment heated by the vapor-conducting pipe.

2. In apparatus for disposition of garbage, a retort and means for heating a suitable charge of material therein; a pipe for conducting the hot vapors from such retort; means for condensing such vapors; a combined evaporating and crystallizing compartment and a radiator within said compartment connected to the hot vapor pipe for heating the same.

3. In apparatus for treating garbage, the combination with a suitable retort and means for heating the same, of a separating box provided with a perforated plate dividing the box into a condensing chamber and a filter chamber, a conducting pipe connecting the retort with the condensing chamber, means for tapping the alcoholic liquors from the condensing chamber, a bed of suitable material in the filter chamber for filtering the lighter vapors, and means connected to the filter chamber for collecting and condensing ammonia liquors.

4. In apparatus for treating garbage, the combination with a suitable retort and means for heating the same, of a separating box provided with a perforated plate dividing the box into a condensing chamber below said plate and a filter chamber above the same, a conducting pipe connecting the retort with the condensing chamber, means for tapping alcoholic liquors from the condensing chamber; a bed of suitable material superimposed upon the perforated plate for filtering the lighter vapors, means above said superimposed bed for conducting away the residual vapors and means for condensing such vapors.

5. In apparatus for treating garbage, the combination with a suitable retort and means for heating the same; of a separating box provided with a perforated plate dividing the box into a condensing chamber below said plate and a filter chamber above the same, a vapor-conducting pipe connecting the retort with the condensing chamber, means for tapping the condensing chamber to obtain alcoholic liquors; a bed of suitable material superimposed on said plate for filtering the lighter vapors; means for conducting away and condensing the residual vapors; and a combined evaporating and crystallizing compartment heated by the vapor conducting pipe.

6. In an apparatus for treating garbage, the combination with a furnace and chimney, of a smoke purifying device connected to the chimney, comprising inlet and outlet chambers having a communicating channel, a liquid filtering agent obstructing the communicating channel, a fan for sucking the smoke into the inlet chamber and a splashing wheel for driving it into the water.

7. In apparatus for treating garbage the combination of a suitable retort and a furnace for heating the same, a hot vapor-conducting pipe; a separating box connected to said vapor pipe provided with means for condensing the alcoholic vapors, means for filtering the lighter ammonia vapors; means for conducting such filtered vapors to a condensing coil; a condensing coil for condensing the same, a combined evaporating and crystallizing compartment heated by the hot vapor conducting pipe and a smoke consuming device for filtering the products of combustion to obtain a dye and eliminate smell.

In witness whereof, I have signed my name to the foregoing specification in the presence of two subscribing witnesses.

RICHARD W. AMOS.

Witnesses:
 FREDERICK P. RANDOLPH,
 HELEN V. HOLMES.